(12) United States Patent
Peden, II et al.

(10) Patent No.: US 7,551,574 B1
(45) Date of Patent: Jun. 23, 2009

(54) METHOD AND APPARATUS FOR CONTROLLING WIRELESS NETWORK ACCESS PRIVILEGES BASED ON WIRELESS CLIENT LOCATION

(75) Inventors: Jeffrey J. Peden, II, Burlington, MA (US); Matthew K. Gray, Somerville, MA (US); Coleman P. Parker, Watertown, MA (US)

(73) Assignee: Trapeze Networks, Inc., Pleasanton, CA (US)

( * ) Notice: Subject to any disclaimer, the term of this patent is extended or adjusted under 35 U.S.C. 154(b) by 544 days.

(21) Appl. No.: 11/094,987

(22) Filed: Mar. 31, 2005

(51) Int. Cl.
*H04B 7/00* (2006.01)
*H04Q 7/00* (2006.01)

(52) U.S. Cl. .............. 370/310.2; 370/328; 370/338; 370/395.42; 370/444; 370/310; 455/456.1; 455/404.2; 455/435.3; 455/512

(58) Field of Classification Search ............ 370/310, 370/332, 236, 230, 328, 338, 310.2, 331, 370/395.42, 455, 444; 455/517, 456.3, 456.1, 455/404.2, 512, 435.3, 166.2
See application file for complete search history.

(56) References Cited

U.S. PATENT DOCUMENTS

| | | | | |
|---|---|---|---|---|
| 6,070,243 | A * | 5/2000 | See et al. ................. | 726/2 |
| 6,148,199 | A * | 11/2000 | Hoffman et al. ........... | 455/433 |
| 6,429,879 | B1 * | 8/2002 | Sturgeon et al. ........... | 715/723 |
| 6,826,399 | B1 * | 11/2004 | Hoffman et al. ........... | 455/433 |
| 6,847,892 | B2 * | 1/2005 | Zhou et al. ............... | 701/213 |
| 6,993,683 | B2 * | 1/2006 | Bhat et al. ............... | 714/43 |
| 2002/0078361 | A1 * | 6/2002 | Giroux et al. ............. | 713/183 |
| 2003/0156586 | A1 * | 8/2003 | Lee et al. ................. | 370/392 |
| 2004/0214572 | A1 * | 10/2004 | Thompson et al. ......... | 455/435.2 |
| 2004/0259575 | A1 * | 12/2004 | Perez-Breva et al. ....... | 455/456.5 |
| 2005/0021979 | A1 * | 1/2005 | Wiedmann et al. ......... | 713/182 |
| 2005/0054350 | A1 * | 3/2005 | Zegelin .................... | 455/456.1 |
| 2005/0128142 | A1 * | 6/2005 | Shin et al. ................ | 342/386 |
| 2005/0159154 | A1 * | 7/2005 | Goren ..................... | 455/434 |
| 2005/0213519 | A1 * | 9/2005 | Relan et al. ............... | 370/277 |
| 2006/0217131 | A1 * | 9/2006 | Alizadeh-Shabdiz et al. | 455/456.1 |

FOREIGN PATENT DOCUMENTS

WO WO 02/089442 A1 11/2002
WO WO 2004/013986 A1 2/2004

OTHER PUBLICATIONS

Chen, et al., "Enabling Location-Based Services on Wireless LANs", 11th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.

* cited by examiner

*Primary Examiner*—Huy Q Phan
(74) *Attorney, Agent, or Firm*—Perkins Coie LLP

(57) ABSTRACT

An access point through which a wireless device attaches to a wireless network determines the access privileges that will be accorded to the device based on a criteria set, such as the ID and physical location of the device requesting network access, the access point through which the device is connected to the network and user credentials. The location of the device is determined by a location determination system using the signal strength of the device signal. The location information and ID information is provided to an access server that uses the criteria set to retrieve access privileges from a privilege database. The retrieved access privileges are then applied to the wireless device by means of the access point and other devices in the wireless network.

30 Claims, 3 Drawing Sheets

METHOD AND APPARATUS FOR CONTROLLING WIRELESS NETWORK ACCESS PRIVILEGES BASED ON WIRELESS CLIENT LOCATION

FIELD OF THE INVENTION

This invention relates to wireless networks and, more particularly, to controlling access privileges of wireless clients that either attempt to access the network or are connected to the network, but change their status.

BACKGROUND OF THE INVENTION

Wireless networks that link together multiple computers are commonplace and the technology for implementing such networks is rapidly growing. The common names for such networking technology are "wireless networking", "WiFi" or "802.11 networking." The big advantage of wireless networking is simplicity, because it allows computers to be connected anywhere in a home or office without the need for physical wires, thereby allowing the computers to be mobile. The computers, called "wireless clients", connect to the network using broadcast radio signals which can travel up to distances of approximately 100 feet.

Wireless networks are generally governed by one of several standards promulgated by the Institute of Electrical and Electronics Engineers (IEEE). The basic standard is denoted as the 802.11 standard and covers wireless networks. The standard has several different versions labeled by a, b and g notations. The different standard versions differ in several respects, including the broadcast signal frequency, transmission speed and data coding techniques. For example, the first wireless networking systems to reach the marketplace were constructed according to the 802.11b standard. Equipment that conforms to the 802.11b standard transmits at 2.4 GHz, can handle data transmission speeds up to 11 megabits per second and uses a data coding technique called "complementary code keying". The 802.11a standard next appeared. Equipment conforming to this standard operates at 5 GHz, can handle up to 54 megabits per second and uses a data coding technique called "orthogonal frequency-division multiplexing" (OFDM). The 802.11g standard has characteristics of both the 802.11a and 802.11b standards in that conforming equipment operates at 2.4 Ghz, but has data transmission speeds of 54 megabits per second and uses OFDM encoding.

Wireless communications are usually designed to take place in a localized area quite often via a local communications network. Such a localized area may be a building, an area within a building, an area comprising several buildings, outdoor areas, or a combination of indoor and outdoor areas. However, due to the broadcast nature of the radio-frequency signal, persons outside of the localized area can often receive the signal and, thus, communicate with the network. In many environments, information on the network is confidential and the ability of unauthorized persons to attach to the network is a serious problem.

A common technique for enhancing the security of a wireless network is to encode the information broadcast via the radio-frequency signals with a WEP key. WEP stands for "Wired Equivalent Privacy", and is an encryption standard that is part of the 802.11 standard. Another technique is to track the physical location of the mobile equipment and disconnect it from the network if the equipment strays outside of a predetermined localized area.

The communication between mobile wireless devices and the local area network (LAN) is often performed using devices, such as "access points" (APs) that are attached to the LAN. The APs are communication ports for wireless devices, which broadcast the radio-frequency signals to, and receive the radio-frequency signals from, the wireless clients. The APs pass messages received from the wireless device across the LAN to other servers, computers, applications, subsystems or systems, as appropriate. Typically, the APs are coupled to one or more network servers, which manage the message traffic flow. Application servers may be coupled to or accessed via the network servers, to provide data or typical application functionality to the wireless device.

Detection and location within a defined local area is often performed using a LAN to which a set of sensors is attached. In order to use such a local area network to determine the physical location of a wireless client, the local area network is equipped with a plurality of radio-frequency signal sensors, which may be incorporated into the access points or may be separate from the access points. Using a technique called "RF fingerprinting" a digital definition of the physical localized area is first developed and then a statistical signal strength model is developed to provide a context within which the detection and tracking will occur. Then the actual radio-frequency signal strength as measured at the sensors is compared to the model to calculate the physical location of each device.

The digital definition of the localized area is comprised of a set of defined regions, areas or locations (collectively referred to as "locales") taking into account various obstructions. Once the digital form of the localized area is formed, the locales are defined and the statistical signal strength model is then defined.

With the digital form of the physical space defined, the signal strength model can be determined. The signal strength model defines, for each access point within the localized area, a pattern of signal strength reception that is anticipated from a mobile device transmitting within the area, taking into account the obstructions and placement of the access points. The signal strength model can be created by actually installing sensors in the physical space and then measuring the strength of signals received at the sensors as a transmitting wireless client moves through the area. Alternatively, simulated access points and simulated wireless client readings can be used to generate the signals strength model.

After the signal strength model is determined, the location of a wireless client can be determined by collecting actual signal strength data from the device as it moves about or resides in the localized area and comparing the actual data against values predicted by the signal strength model. The RF fingerprinting process is described in more detail in U.S. Pat. No. 6,674,403, the contents of which are hereby incorporated in their entirety by reference.

Alternatively, other location techniques could be used. For example, some known location techniques use the time of arrival of signals or differences between the time of arrival of signals from the wireless device at the APs to calculate the location of the wireless device. For example, such systems are described in U.S. Pat. Nos. 6,801,782 and 6,756,940.

Once a wireless client has been located, access is usually denied if the unit is outside the localized area. This provides security and prevents unauthorized users from attaching or staying attached to the network, but is not very flexible because the system cannot differentiate between authorized users who are properly attached to the network.

SUMMARY OF THE INVENTION

In accordance with the principles of the invention, the access point through which a device attaches to the network determines the access privileges that will be accorded to the device based on a criteria set, such as the ID and physical location of the device requesting network access, the access point through which the device is connected to the network and user credentials. The criteria set is used to determine network access privileges that can include access (or lack thereof to different portions of the network, access to particular local hosts, access to the Internet, access to particular hosts on the Internet, access to particular services on the Internet (filtered either by port or by stateful protocol analysis), restrictions on bandwidth consumption, flagging of traffic with particular quality of service benefits or restrictions, or any number of other network configuration parameters.

When a device changes any of the criteria in the criteria set, the network access privileges dynamically change in an appropriate manner. Similarly, if the network access privileges for that criteria set change, then the network access privileges for a device with that criteria set would change to conform. In some cases, when enough information has not been collected to accurately determine the location of a device, the device would be assigned default network access privileges.

In one embodiment, an access point contacts an access server on the network and requests network access privileges that should be provided to the device requesting access. In another embodiment, the access server publishes the network access privilege information to all access points, either in response to a poll by an access point or asynchronously.

In another embodiment, virtual local area networks (VLANs) are established on the network and each device is assigned to a particular VLAN. Network access privileges can then be assigned to a particular VLAN.

In still another embodiment, a VLAN is created by tagging each data packet or frame with an ID code associated with a particular VLAN. Special access points are used that detect the tag and use the VLAN ID code to determine the network access privileges accorded to the VLAN and, thus, to the user.

In yet another embodiment, network access restrictions can be applied by another device in the data path, such as a switch, router or gateway. In addition, restrictions could also be applied by a stateful packet filter.

BRIEF DESCRIPTION OF THE DRAWINGS

The above and further advantages of the invention may be better understood by referring to the following description in conjunction with the accompanying drawings in which.

DETAILED DESCRIPTION

Figure 1:
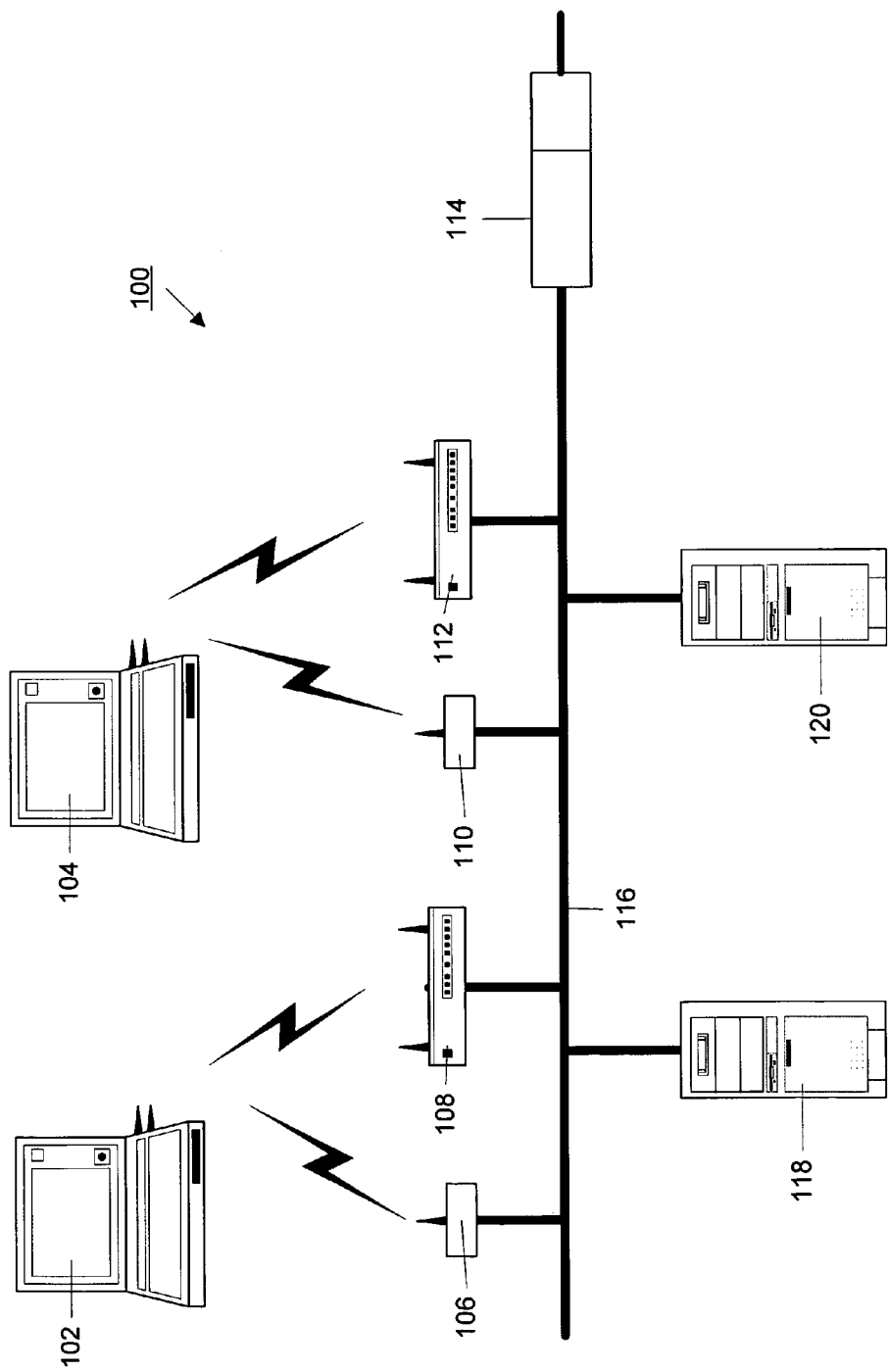
FIG. 1 is a block schematic diagram showing typical components in a wireless network.

FIG. 1 is a block schematic diagram of a typical wireless network 100. Two wireless clients, 102 and 104, are shown. The wireless clients 102 and 104 are linked to the network 100 by means of access points of which two access points 108 and 112 are illustrated in the figure. Those skilled in the art would understand that at least one access point is required, but typical networks would have many access points.

The access points 108 and 112 are connected to a network 116 which can be a LAN, such as an Ethernet network, or another type of network. The network 116 may also have other devices, such as servers 118 and 120 connected to it. Network 116 may further be connected to another network, such as a WAN or the Internet via a router 114.

One or more signal sensors may also be connected to the network 116, of which two sensors, 106 and 110, are shown. These sensors measure the signal strength of the RF signal generated by the wireless clients 102 and 104 and are used by a conventional location tracking system, for example, an RF fingerprinting system as described above. As known in the art, the sensors 106 and 110 may also be integrated into the access points 108 and 112. The location tracking system typically operates on one of the servers, such as server 118. In accordance with the principles of the invention, the server 118 may also incorporate an access control system.

In one embodiment, the access control system operates when a wireless client, such as client 102 connects to a wireless access point, such as access point 108. Access point 108 then contacts the access control server 118 and requests information on the network access privileges that should be provided to the client 102. The server then accesses a database to retrieve the privileges assigned to the client based on information identifying the client, the device location, the access point to which the client is connected and other user authentication credentials. For example in one embodiment, the wireless client device can be identified by using the device Media Access Control (MAC) address as a client device ID. Similarly, the access point is identified by its network IP address. The additional information can include user credentials. This information is sent to the access control server with the request. Alternatively, information that identifies the wireless client may be sent directly from the wireless client, via the access point, to the access control server.

Figure 2:
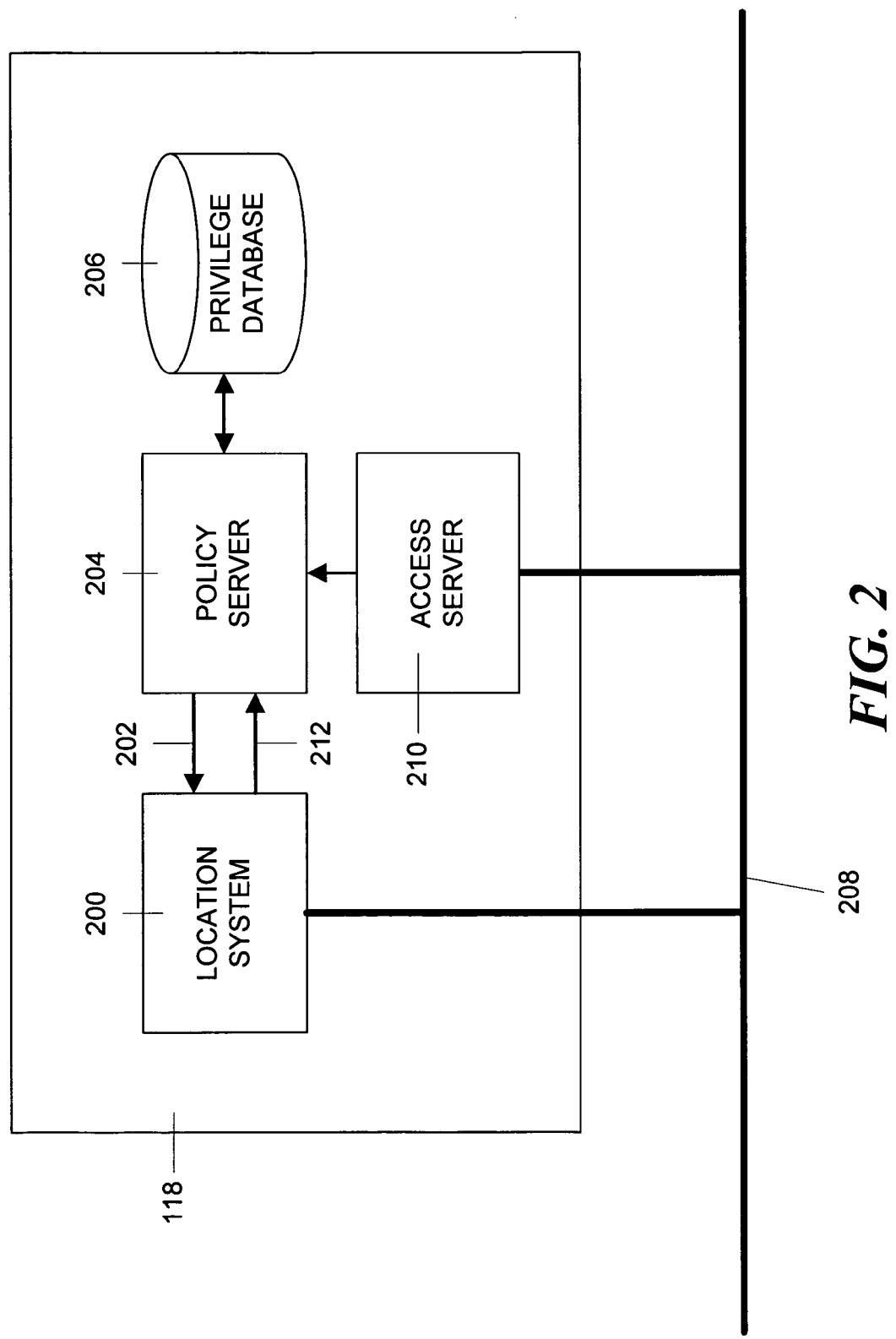
FIG. 2 is a more detailed block schematic diagram of a server in the system of FIG. 1 incorporating a location system and an access server.
Figure 3:
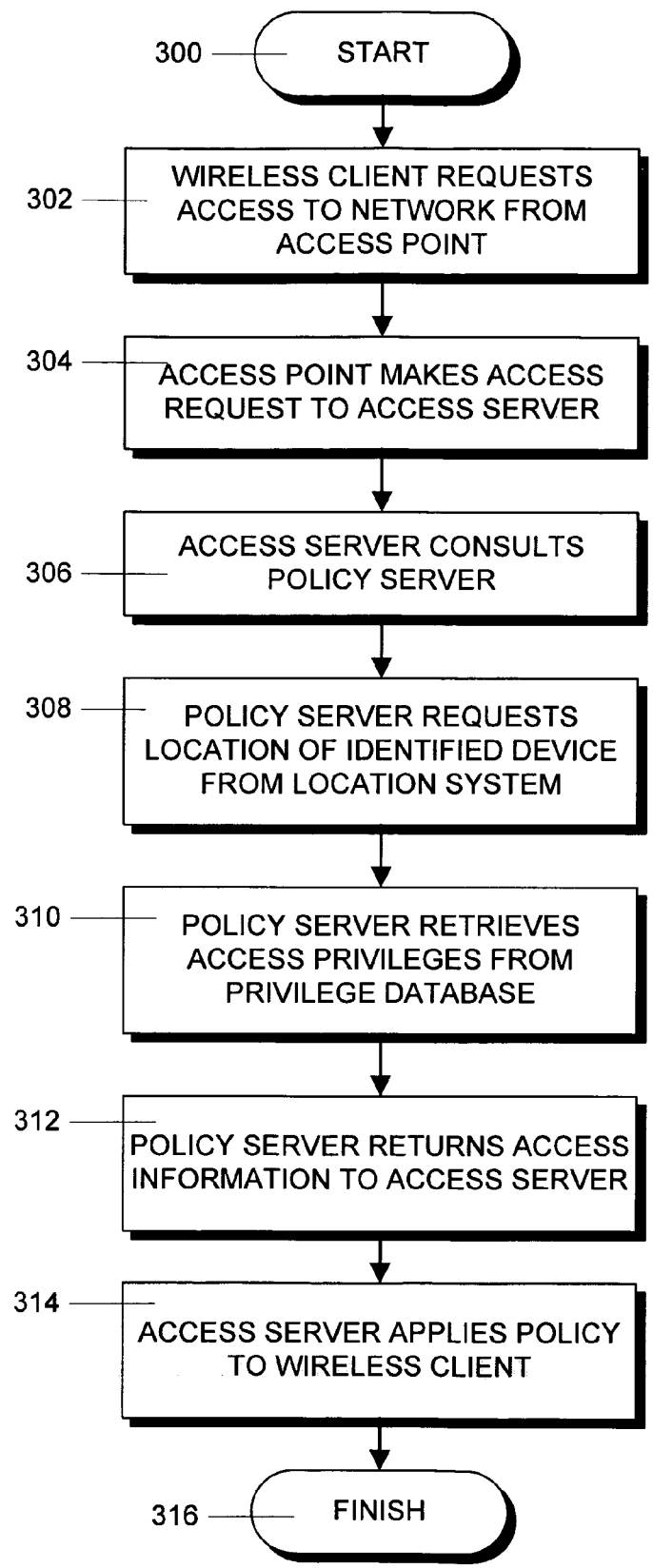
FIG. 3 is a flowchart showing the steps in an illustrative process for applying network access privileges to wireless clients in accordance with the principles of the invention.

A more detailed view of server 118 incorporating the access system is shown in FIG. 2 and the process performed by the system is shown in FIG. 3. The process begins in step 300 and proceeds to step 302 where a wireless client requests access to the network from a wireless access point. The wireless access point, in turn, requests access to the network from the access system and specifically from an access server 210 over the network 208 as shown in step 304.

In one embodiment, the access server 210 is a RADIUS (Remote Authentication Dial In User Services) server. A RADIUS server performs access control services in accordance with the well-known RADIUS access control protocol that defines a request/response process. The RADIUS protocol is well-known and is defined by the Internet Engineering Task Force (IETF) in Request for Comment (RFC) 2865 and expanded in additional documents published by the IETF. In this embodiment, the access server 210 acts as a RADIUS security server. When an access point makes a request on behalf of a wireless client for network access, the access server 210 also receives information identifying the wireless client and access point from the access point. Using this information, the access server 210 consults a policy server 204 as set forth in step 306, which generates network access privileges assigned to that wireless client. In accordance with the RADIUS protocol, the access server 210 then returns a permit access or deny access response to the access point. If a permit access response is returned, the access server uses the privilege information returned by the policy server to specify additional restrictions or privileges to be applied to the wireless client. Restrictions on access to a particular device are implemented using the media access control (MAC) address of that device. Restrictions based on the access point use the access point ID code. User credential restrictions are based on user credentials specified in a set of standards known as IEEE 802.11i standards which build upon an IEEE 802.1X standard.

As noted above, the access server 210 consults a policy server 204 that is also running in the access server 118. When the policy server 204 receives a request from the access server 210 for network access privilege information for a particular wireless client, as set forth in step 308, it requests location information from a location system 200 running in server 118 as indicated schematically by arrow 202 using the client device ID received from the access point, via the access server 210, to identify the client. In particular, as previously mentioned, location system 200 uses information collected from signal strength sensors to calculate the location of wireless clients in the system.

The location informed returned by the location system 200 may take one of several forms. In one form, the location information is a label which may have hierarchical, adjacency and geometric relationships with other labeled locations. For example, two very broad locations called "zones" may be used called the "inside" zone and the "outside" zone. The "Inside" zone may be composed of sub-zones, such as "engineering", "executive" and "sales". The "engineering" sub-zone and the "sales" sub-zone may be adjacent, but the "engineering" sub-zone may not be adjacent to the "executive" sub-zone. Further, each location may have a specified geometry associated with it in one or more coordinate frames (called "views") corresponding to different maps or visualizations of a space. The location information may also take the form of a set of coordinates, xyz at a minimum and theoretically also containing other degrees of freedom. Location information may further consist of multiple labels or coordinates and associated confidences. For example "inside":90%, "outside":10%, "engineering":70% and "sales":30%. In this arrangement, due to the hierarchical nature of the locations, the confidences only sum to 100% at the same level in the hierarchy. The location information is returned from the location system 200 to the access server 204 as indicated schematically by arrow 212.

Next, in step 310, using the client device ID, the device location, the access point to which the client is connected and the other user authentication credentials provided by the access point, the policy server 204 accesses the privilege database 206 and retrieves the privilege set associated with the combination of information provided by the access point. For example, the location information may be used to control access by a particular configured mapping, such as a client device located in the "outside" zone is not granted access; a client device located in the "inside" zone is granted "standard access" and a client device located in the "engineering" sub-zone is granted "privileged access."

Alternatively, the location information may be applied such that rights are dynamically granted and revoked. For example, a client device may be initially fully restricted and with no privileges and thus be unable to access any services on the network. If the same device moves to the "inside" zone, it is granted rights A, B and C. Later, if that device moves to the "sales" sub-zone, it is granted right D and right A is revoked. Still later if the device moves to the "engineering" sub-zone, it is granted grant right E and right B is revoked. Alternatively, if that device is located in the "executive" sub-zone, it is granted rights D, F and G and rights A and C are revoked.

Further, policies may be applied based on "second order" information about the location. For example, a client device may be granted network access only if it is in the same location as a device in previously defined privileged group or a device may be granted access if it has been in a particular location in the past twenty-four hours. Finally, in each of these cases the applied policy could be determined by asking an external system In addition to the combination of the client device ID, device location, access point ID and user authentication credentials, a wide range of other qualifications could apply, including the time of day, any previously-visited locations, the presence of other particular users in the same location, the quantity of users in the same location, the presence or quantity of users in some other fixed or related location, the data rate of communication, the presence or absence of other users on the same access point, the relative location of the user and the access point and permutations of the aforementioned criteria. Further, privileges and restrictions may be applied for a period of time during which the privileges and restrictions are valid. For example, a given set of privileges and restrictions may be applied for the next ten minutes. After the period of time has expired, the policy server can specify an additional action that can be performed. For example, the policy server may specify that, after the period of time has expired, the network connection will be terminated, or the wireless client will be required to request an additional time period for access.

The privilege set retrieved from the database 206 specifies various privileges or restrictions that are applied to the wireless client. These privileges and restriction can include granting, or denial, of access to (1) different portions of the network 208, (2) particular hosts on the network 208, (3) the Internet, (4) particular hosts on the Internet and (5) particular services on the Internet (filtered either by port or by stateful protocol analysis). Other restrictions can include restrictions on bandwidth consumption. Other operations can also be performed, such as flagging of traffic with particular quality of service restrictions or benefits or any number of other network configuration parameters. Privileges and restrictions are typically applied by a component in the data path between the wireless client device and the network to which it is connected. This component will typically be an access point, a switch or a router. The inline component will apply the privileges and restrictions by routing, dropping, redirecting, modifying or responding to each packet based on the privilege set.

In the aforementioned embodiment using RADIUS servers, once the policy server 204 obtains the privilege set and restrictions from the privilege database 206, it returns the access information to the access server 210 in step 312. Then, in step 314, the access server 210 applies the restrictions to the wireless client identified by the client device ID. The process then finishes in step 314.

In another embodiment, access restrictions and privileges are applied across the network by using the RADIUS access server 210 to assign each client device to a virtual local network (VLAN) that is established using VLAN tagging. More specifically, a particular restriction and privilege set is associated with a VLAN and inline components mentioned above are programmed to provide privileges and restrictions to all devices on that VLAN. With this arrangement, a particular restriction and privilege set is applied to a client by assigning that client to a VLAN that has been programmed to implement those privileges and restrictions.

A VLAN can be established by tagging each data packet generated by a device assigned to that VLAN with information that identifies the VLAN. VLAN tagging can be carried out in compliance with an IEEE standard known as the 802.1q standard. This standard was originally written to define the operation of VLAN bridges that permit the definition, operation and administration of VLAN topologies within a bridged LAN infrastructure. In particular, the standard specifies the contents of a tag field containing VLAN information that can be inserted into an Ethernet frame. If a port has an 802.1q-compliant device attached (such as a network switch or router), these tagged frames can carry VLAN membership information, such as an ID that identifies the VLAN, which allows the device to apply restrictions associated with that VLAN by permitting or denying the tagged frame to pass through the device.

In accordance with this VLAN tagging embodiment, in step 310, the policy server would retrieve a VLAN tag from the privilege database and in steps 312 and 314, this VLAN tag would be provided to the access server 210, which, in turn, would cause the access point to which the client device is connected to apply that VLAN tag to all data packets sent from that device. Then, as previously mentioned, the VLAN tag will cause the other inline components to apply the policy by permitting or denying the tagged frame to pass through the component. When the device moves to a different location, it may be assigned to a new VLAN by changing the VLAN tag. This new VLAN may have different privileges and restrictions.

Typically, a new network address must be assigned to a client device when it changes from one VLAN to another VLAN. In order to avoid this change in the network address, it is also possible in another embodiment to assign each client device to a VLAN that is dedicated to that device. Then privileges and restrictions for a device are changed by changing the privileges and restrictions assigned to the VLAN dedicated to that device.

In still another embodiment, after the privilege information has been applied, each access point then periodically polls the access server to verify that the appropriate access permissions are still in place. Therefore, when a device changes its user credentials, its location (by moving) or its access point, the access restrictions can be changed appropriately. Similarly, if the policy for the combination of the device, user, location and access change, the restrictions would change to conform. In some cases, when enough information has not been collected to accurately determine the location of the device, the device would be assigned temporarily a default set of permissions.

In yet additional embodiments, the access server could either publish privilege information to all access points or could notify the access points of changes to the access permissions asynchronously. In other embodiments, the access point or another gateway device could determine the location of the wireless client instead of the location system running in a server. Further, instead of the access point applying any restrictions, any device, such as a switch, router or gateway, in the data path could control access. In addition, instead of applying network restrictions via an 802.1q VLAN tag, the restrictions could instead be applied through a stateful packet filter.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, other mechanisms for computing the location of the wireless client and for granting privileges may be used. In addition, although client server networks have been shown for purposes of illustration, access policies could also be imposed on network traffic on conventional mesh-style networks using the principles of the invention. Other aspects, such as the specific process flow and the order of the illustrated steps, as well as other modifications to the inventive concept are intended to be covered by the appended claims.

What is claimed is:

1. A method for controlling access privileges in a wireless network having a plurality of access points based on the location of a wireless client that is connected to the network via radio-frequency signals sent between the wireless client and one of the plurality of access points wherein the one access point interacts with a RADIUS server to obtain access to the network, the method comprising:
   (a) computing, using a location system that is associated with the network and does not involve the wireless client, the location of the wireless client with an RF fingerprinting method from measured properties of radio frequency signals generated by the wireless client and received at a plurality of sensors connected to the network;
   (b) receiving information that identifies the wireless client;
   (c) generating a set of access privileges based on the location and the identifying information of the wireless client; and
   (d) sending the access privileges to the RADIUS server and using the RADIUS server to cause the one access point to apply the access privileges to the wireless client before the wireless client accesses the network via the one access point.

2. The method of claim 1 wherein step (b) comprises receiving from the access point a device ID of the wireless client.

3. The method of claim 2 wherein the device ID is a device MAC address.

4. The method of claim 2 wherein step (b) comprises receiving from the access point an access point ID of the access point.

5. The method of claim 1 wherein step (c) comprises retrieving the set of access privileges from a privilege database using the location and the identifying information of the wireless client.

6. The method of claim 1 wherein step (d) comprises assigning the wireless client to a virtual LAN, identifying each data packet sent from the wireless client with a tag specifying that the data packet is part of the virtual LAN and using devices that respond to the tag to apply the access privileges.

7. The method of claim 6 wherein step (d) further comprises changing the access privileges assigned to the wireless client by changing the virtual LAN to which the wireless client is assigned.

8. The method of claim 6 wherein step (d) further comprises changing the access privileges assigned to the wireless client by changing devices that respond to the tag to apply different access privileges to the wireless client.

9. The method of claim 1 wherein step (d) comprises using stateful packet filtering to apply the privileges.

10. The method of claim 1 wherein step (c) is performed by an access server connected to the wireless network and wherein the access point recurrently polls the access server to cause step (c) to be recurrently performed.

11. The method of claim 1 wherein step (c) is recurrently performed and the set of access privileges is recurrently sent to the access point.

12. The method of claim 1 wherein step (d) comprises applying the access privileges to the wireless client for a predetermined period of time.

13. The method of claim 12 wherein step (d) comprises performing an additional action after the predetermined period of time has expired.

14. The method of claim 1 wherein step (d) comprises applying the access privileges to the wireless client based on the time of day.

15. Apparatus for controlling access privileges in a wireless network having a plurality of access points based on the location of a wireless client that is connected to the network via radio-frequency signals sent between the wireless client and one of the plurality of access points wherein the one access point interacts with a RADIUS server to obtain access to the network, the apparatus comprising:
a location system that is associated with the network and does not involve the wireless client and computes the location of the wireless client with an RF fingerprinting method from measured properties of radio frequency signals generated by the wireless client and received at a plurality of sensors connected to the network;
an access server that receives information that identifies the wireless client;
a policy server that generates a set of access privileges based on the location and the identifying information of the wireless client; and
a mechanism that comprises means for sending the access privileges to the RADIUS server and means for using the RADIUS server to cause the one access point to apply the access privileges to the wireless client before the wireless client accesses the network via the access point.

16. The apparatus of claim 15 wherein the access server comprises means for receiving from the access point a device ID of the wireless client.

17. The apparatus of claim 16 wherein the device ID is a device MAC address.

18. The apparatus of claim 16 wherein the access server comprises means for receiving from the access point an access point ID of the access point.

19. The apparatus of claim 15 wherein the policy server comprises means for retrieving the set of access privileges from a privilege database using the location and the identifying information of the wireless client.

20. The apparatus of claim 15 wherein the mechanism that applies the access privileges to the wireless client comprises:
means for assigning the wireless client to a virtual LAN;
means for identifying each data packet sent from the wireless client with a tag specifying that the data packet is part of the virtual LAN; and
means for using devices that respond to the tag to apply the access privileges.

21. The apparatus of claim 20 wherein the mechanism that applies the access privileges to the wireless client further comprises means for changing the access privileges assigned to the wireless client by changing the virtual LAN to which the wireless client is assigned.

22. The apparatus of claim 20 wherein the mechanism that applies the access privileges to the wireless client further comprises means for changing the access privileges assigned to the wireless client by changing devices that respond to the tag to apply different access privileges to the wireless client.

23. The apparatus of claim 15 wherein the mechanism that applies the access privileges to the wireless client comprises means for using stateful packet filtering to apply the privileges.

24. The apparatus of claim 15 wherein the access point recurrently polls the access server to recurrently cause the policy server to generate a set of access privileges based on the location and the identifying information of the wireless client.

25. The apparatus of claim 15 wherein the policy server recurrently generates a set of access privileges based on the location and the identifying information of the wireless client and the generated set of access privileges is recurrently sent to the access point.

26. The apparatus of claim 15 wherein the mechanism that applies the access privileges to the wireless client comprises means for applying the access privileges to the wireless client for a predetermined period of time.

27. The apparatus of claim 26 wherein the mechanism that applies the access privileges to the wireless client comprises means for performing an additional action after the predetermined period of time has expired.

28. The apparatus of claim 15 wherein the mechanism that applies the access privileges to the wireless client comprises means for applying the access privileges based on the time of day.

29. Apparatus for controlling access privileges in a wireless network having a plurality of access points based on the location of a wireless client that is connected to the network via radio-frequency signals sent between the wireless client and one of the plurality of access points wherein the one access point interacts with a RADIUS server to obtain access to the network, the apparatus comprising:
means associated with the network and that does not involve the wireless client for computing the location of the wireless client with an RF fingerprinting method from measured properties of radio frequency signals generated by the wireless client and received at a plurality of sensors connected to the network;
means for receiving information that identifies the wireless client;
means for generating a set of access privileges based on the location and the identifying information of the wireless client; and means for sending the access privileges to the RADIUS server and means for using the RADIUS server to cause the one access point to apply the access privileges to the wireless client before the wireless client accesses the network via the access point.

30. A computer program product for controlling access privileges in a wireless network having a plurality of access points based on the location of a wireless client that is connected to the network via radio-frequency signals sent between the wireless client and one of the plurality of access points wherein the one access point interacts with a RADIUS server to obtain access to the network, the computer program product comprising a computer usable tangible storage medium having computer readable program code thereon, including:

program code operable in a location system that is associated with the network and does not involve the wireless client for computing the location of the wireless client with an RF fingerprinting method from measured properties of radio frequency signals generated by the wireless client and received at a plurality of sensors connected to the network;

program code for receiving information that identifies the wireless client;

program code for generating a set of access privileges based on the location and the identifying information of the wireless client; and program code for sending the access privileges to the RADIUS server and program code for using the RADIUS server to cause the one access point to apply the access privileges to the wireless client before the wireless client accesses the network via the access point.

\* \* \* \* \*